United States Patent
Campbell

[11] 3,881,393
[45] May 6, 1975

[54] EXPANSION FASTENER

[76] Inventor: Maxwell S. Campbell, P.O. Box 134, Elkins, N.H. 03233

[22] Filed: Nov. 27, 1972

[21] Appl. No.: 309,702

[52] U.S. Cl. .................................................. 85/64
[51] Int. Cl. ........................................... F16b 13/06
[58] Field of Search .......................... 85/64, 70, 648

[56] References Cited
UNITED STATES PATENTS

| | | | |
|---|---|---|---|
| 1,320,622 | 11/1919 | Kennedy | 85/70 |
| 1,419,979 | 6/1922 | Ogden | 85/70 |
| 1,468,074 | 9/1923 | Peirce | 85/64 |
| 2,690,693 | 10/1954 | Campbell | 85/64 |
| 2,842,999 | 7/1958 | Huston | 85/64 |
| 3,727,901 | 4/1973 | Textrom | 85/64 |

Primary Examiner—Edward C. Allen
Attorney, Agent, or Firm—James E. Mrose

[57] ABSTRACT

An expansion fastener of the type employing a helical coil which expands radially under force applied in its axial direction, to lock the fastener in a hole. A nut, or the head of a bolt, engages the uppermost turn of the coil, but this turn is free to expand radially along with the rest of the coil to provide additional bearing area in the deepest part of the hole. In one form, the upper rim of the uppermost turn is designed to be upset inward to maintain engagement with the nut as this turn expands under the applied load. In another form, the nut has a lower rim portion which expands radially under the load. In still another form, a washer of dished cross section is disposed between the nut and the uppermost turn, and flattens under load to maintain engagement with both.

6 Claims, 14 Drawing Figures

EXPANSION FASTENER

This invention relates to expansion fasteners, and more particularly to a fastener of the type described in my previous U.S. Pat. No. 2,690,693, dated Oct. 5, 1954. The previously patented fastener utilizes a helical coil which expands under axial load to grips the wall of the hole in which the fastener is placed.

BACKGROUND OF THE INVENTION

In the fastener described in my previous patent, the uppermost turn of the coil is firmly attached to the bolt which the coil surrounds, and does not expand radially. This turn, therefore, does not contribute to the locking action, but serves merely as a collar to transmit the axial load from the nut or bolt head to the coils beneath. In that patent, as here the fastener is illustrated as it would be used in a mine roof, which is a typical application for fasteners of the type here described. It is understood, however, that the fastener can be used as a wall or floor anchor, and for many other purposes. The term "uppermost turn" as used herein refers to the turn furthest from the entry of the hole, whatever position the fastener may actually be used in.

As the holding capacity, in this type of fastener, depends on frictional engagement between the locking coil and the wall of the hole, it is desirable to provide such engagement over the largest area, and to the deepest level possible for a given length of fastener. It is also necessary to insure that the nut, or head of the bolt as the case may be, cannot separate from and slip through the uppermost turn of the coil, because, if that occurred, the fastener would fail.

The principal object of this invention is to provide a fastener of the type utilizing a helical spring coil as a locking member, in which the holding capacity of the coil is significantly increased, as compared to that of previous fasteners. Another object is to provide a fastener in which the nut, or bolt head, bearing on the uppermost turn of the coil cannot slip through the coil. Other objects, advantages, and novel features will be apparent from the following description.

SUMMARY

The fastener here disclosed has a bearing member, which may be a nut into which a bolt is threaded or the head of a bolt. A helical spring coil with spaced turns surrounds the bolt and has an uppermost turn on which the bearing member bears when axial load is applied to the fastener. In one form of fastener, the uppermost turn is bevelled inward at its upper edge and grooved somewhat below the edge to form a rim portion which is upset inward as that turn expands under applied load. The rim portion thus maintains positive mechanical engagement between the nut or bolt head and the uppermost turn. In another form, a washer of dished cross-section is interposed between the bearing member and the uppermost coil and tends to spread under axial load to maintain engagement with both the bearing member and the uppermost coil. In still another form, the nut has an undercut rim which tends to expand under load and maintain contact with the uppermost coil as the coil expands.

DESCRIPTION OF THE PREFERRED EMBODIMENT

Figure 1:
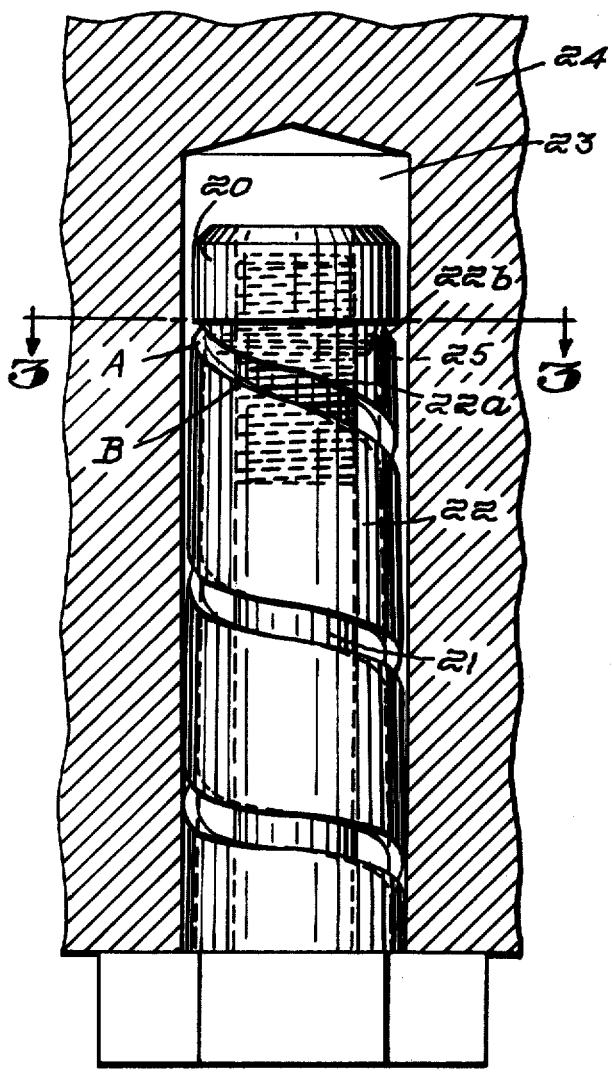
FIG. 1 is a side elevation of a fastener constructed according to the invention, shown in unloaded condition.
Figure 2:
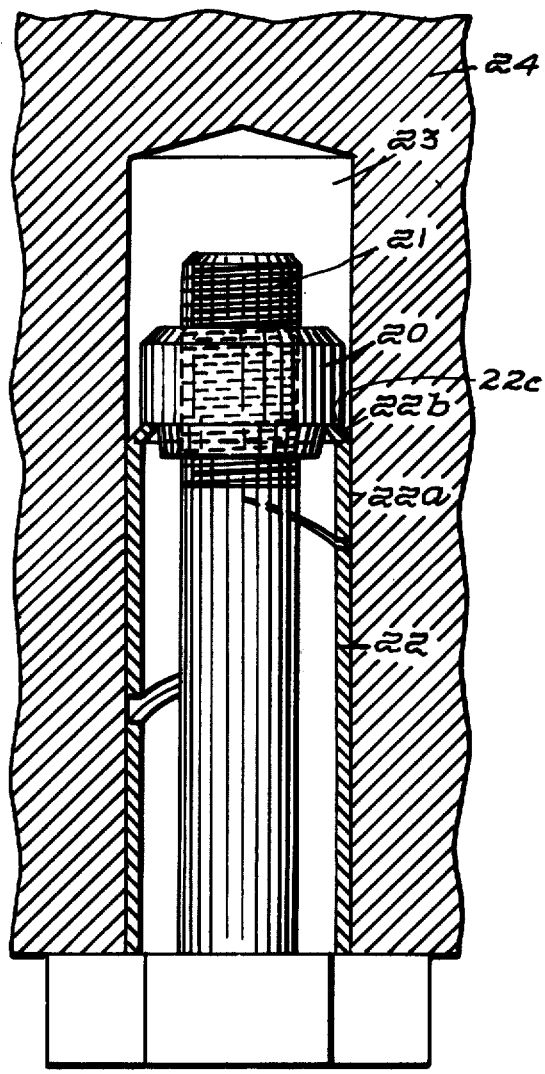
FIG. 2 is a side elevation, partly in cross-section, of the fastener of FIG. 1 in loaded condition.
Figure 3:
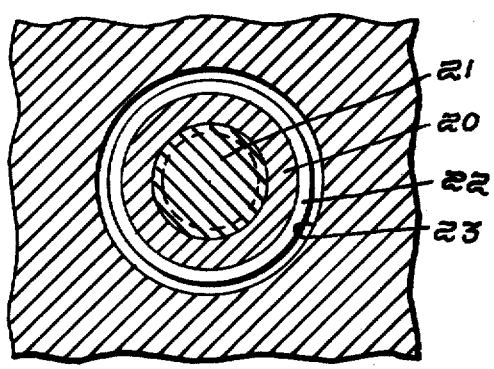
FIG. 3 is a cross-section, taken along line 3 — 3 of FIG. 1.

As shown in FIG. 1 – 3, the fastener includes a nut 20 into which a bolt 21 is threaded. A helical spring coil 22 with spaced turns surrounds the bolt and has its upper edge welded to the nut. The fastener is shown in place in a hole 23 bored in material 24. The fastener is shown in unloaded condition in FIG. 1, with the uppermost turn 22a of the coil not engaging the wall of the hole. An internal groove 25 on the uppermost turn of the coil forms an upper rim portion 22b. The upper edge 22c of that turn is bevelled inward.

In FIG. 2 the effects of axially loading the fastener by tightening the bolt in the nut are illustrated. The load transmitted to the bevelled edge 22c acts on the inner wall of the rim portion 22b overlying groove 25 and causes the rim portion to be upset inward, as turn 22a expands to grip the wall of the hole. The rim portion thus maintains engagement between the nut and the uppermost turn of the coil. The edge 22c also contracts to grip the base 20a of the nut and increase the shear resistance to torque which builds up between the coil and the nut as the bolt is tightened.

An expansion fastener of this general type can fail by (1) failure of the bolt itself due to fracture or stripping of the threaded portion, (2) slippage of the locking coil in the hole, or (3) yielding of the load bearing material surrounding the hole. Ideally, in order to achieve maximum efficiency of the fastener as a whole, the holding capacity should approach the ultimate tensile strength of the bolt itself. The limitation imposed on the load bearing capacity of the fastener by consideration (2) can be raised by increasing the length or diameter of the coil to the extent allowed by other design considerations such as the hole size and depth permissible in a particular application. The load carrying capacity of the material in which the fastener is mounted depends on the composition of the material and the area over which the load is distributed.

Figure 4:
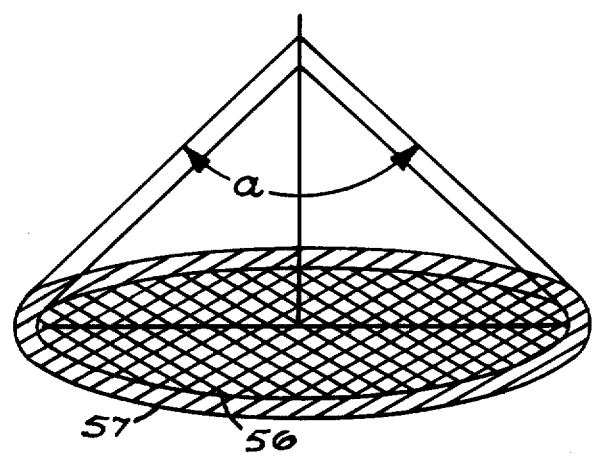
FIG. 4 is a schematic diagram illustrating the stress distribution surrounding a hole in which a loaded fastener is located.

FIG. 4 illustrates the theoretical load distribution in the material surrounding a hole in which a fastener having a 360° gripping action is mounted. The load is distributed over an area projected by a cone of angle a the angle being determined by the characteristics of the material. The inner circle 56 defines the area over which the load is distributed in the case of a fastener such as that described in my previous U.S. Pat. No. 2,690,693, in which the uppermost turn of the coil is fixed to the bolt and does not expand to grip the wall of the hole. The outer circle 57 defines the area over which the load is distributed by a fastener of the same length constructed as described in the present application, in which the uppermost turn of the coil also expands and engages the wall of the hole. It is apparent that the increase in the area over which the load is distributed in the material surrounding the hole is significantly greater as the locking action goes deeper into the hole. By causing the uppermost coil to expand and produce locking action, a considerable increase in the load carrying to capacity of the material around the hole for a given length of fastener is obtained. The locking friction is also increased in proportion to the added area of the uppermost turn.

Figure 5:
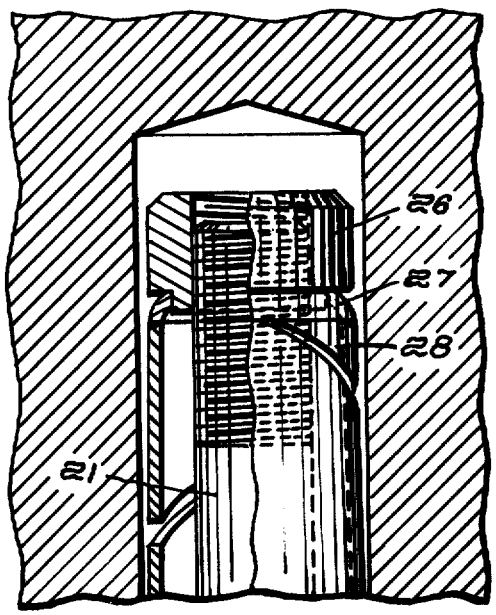
FIG. 5 is a fragmentary elevation, partly in cross-section, of a modified form of the fastener in unloaded condition.
Figure 6:
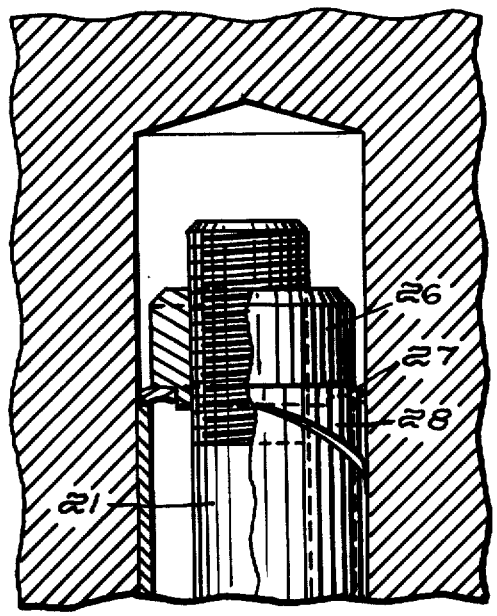
FIG. 6 is a view similar to FIG. 5, showing the fastener in loaded condition.
Figure 7:
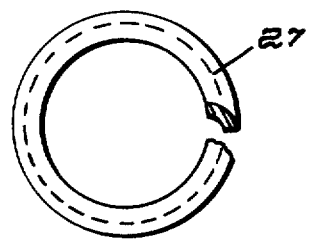
FIG. 7 is a plan view, partly broken away, of the washer used in the fastener of FIG. 5.

The fastener illustrated in FIGS. 5, 6 and 7 consists of a nut 26, into which the bolt 21 is threaded, a circular washer of dished cross-section, 27, and a coil 28. The washer is welded to the nut and the uppermost turn of coil 28. Under load, the washer flattens out, as shown in FIG. 6, expanding at its outer portion to maintain bearing engagement with the uppermost turn of the coil as it expands, and at the same time, contracting at its inner edge to grip the base of the nut and increase shear resistance between the nut and the washer.

Figure 8:
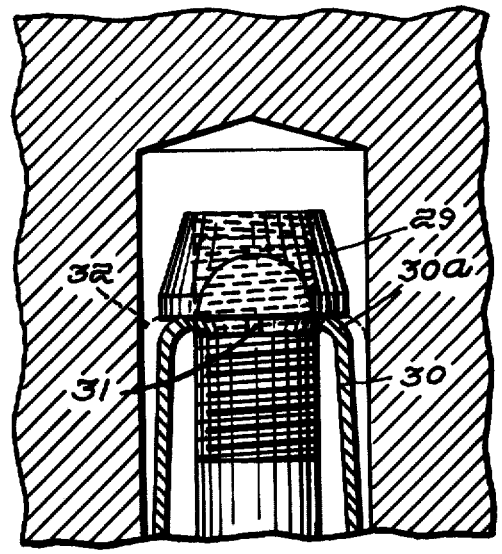
FIG. 8 is a fragmentary elevation, partly in cross-section, of another modification of the fastener.
Figure 9:
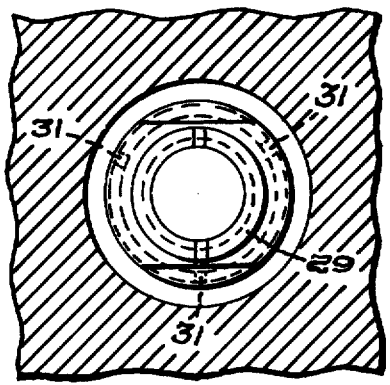
FIG. 9 is a top view of the fastener of FIG. 8.

The fastener shown in FIGS. 8 and 9 has a nut 29 and a coil 30 with an upper rim 30a which is initially bent inward. The nut is provided with welding studs 31, which sink into the edge of rim 30a when the welding current is applied. This type of welding connection, which may also be used on the other variations of the fastener here described, produces high shear strength between the nut and the coil to withstand the shear load applied in torque as the fastener is tightened. When the axial load is applied, the upper rim 30a flattens out further as the upper turn of the coil expands. Rim 30a also contracts at its inner edge to grip the base of the nut. The positions of the rim and upper turn of the coil when fully loaded are illustrated by the dotted lines 32.

Figure 10:
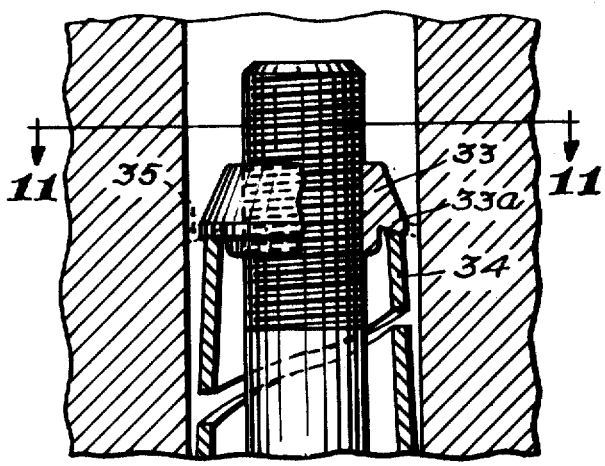
FIG. 10 is a fragmentary elevation, partly in cross-section, of still another modification of the fastener.
Figure 12:
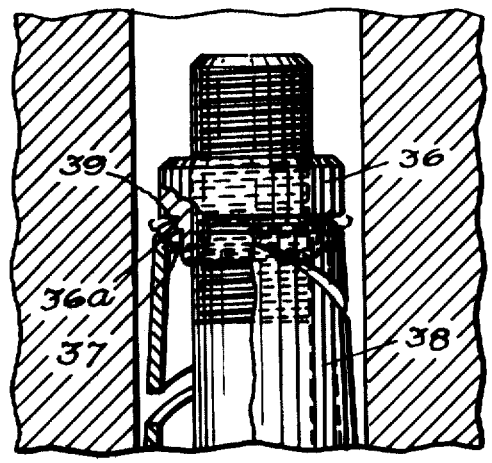
FIG. 12 is a fragmentary elevation, partly in cross-section, of a variation of the fastener of FIG. 10.
Figure 11:
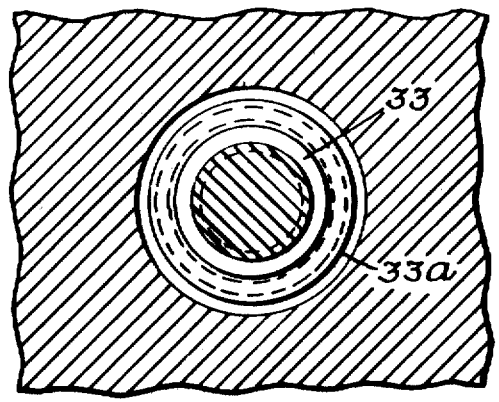
FIG. 11 is a cross-section taken along line 11 — 11 of FIG. 10.

The fastener illustrated in FIGS. 10 and 11 has a nut 33 with a tapered undercut lower rim portion 33a. The rim portion bears on the upper turn of coil 34 and is welded to the coil. Under load, rim portion 33a flattens out as illustrated by the dotted lines 35, to maintain bearing engagement with the upper turn of the coil as it expands. FIG. 12 illustrates a variation of this construction in which the nut 36 has a peripheral groove 37 forming a downwardly sloping undercut lip portion 36a which bears on the uppermost turn of coil 38. This lip likewise flattens out under load to maintain bearing engagement with the uppermost turn of the coil, as illustrated by the dotted lines 39.

Figure 13:
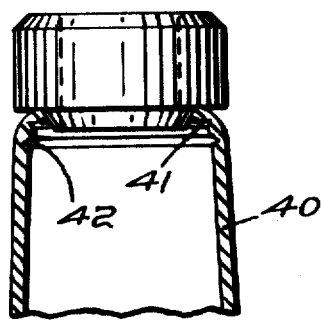
FIG. 13 is a fragmentary cross-section illustrating a variation of the fastener of FIG. 1.

FIG. 13 illustrates a fastener in which the coil 40 has two grooves 41 and 42 on the inner side of its uppermost turn. This construction provides greater flexibility for the upper rim portion of that turn, as compared to the form shown in FIG. 1. Additional grooves can be provided, and the depth of the grooves varied according to the response required under load by various conditions, such as size of the coil, the relationship of coil size to hole size, and other factors which enter into the design.

Figure 14:
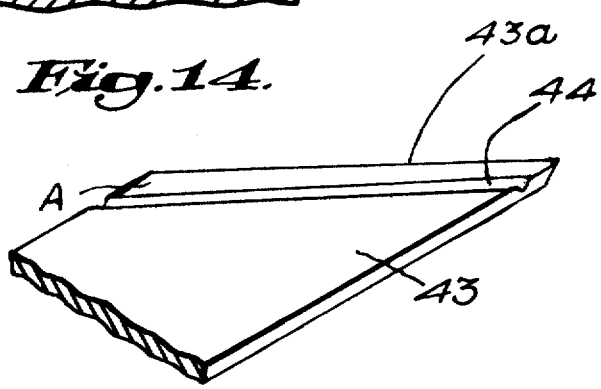
FIG. 14 is a fragmentary view of the inside of a variation of a blank used to form the coil in the fastener shown in FIG. 1.

FIG. 14 illustrates a coil blank prior to forming into a helical coil such as coil 22 in FIG. 1. The blank 43 has a groove 44 which is disposed at a slight angle with respect to the upper edge 43a of the coil. As the fastener is being tightened, both torque and axial loading are applied to the coil. It has been found that these forces initially tend to concentrate in region A of the upper turn, causing the rim portion in that region to yield first. An eccentric load is thus produced which tends to shift the nut sidewise. By making the rim portion somewhat wider in this region bearing engagement between the nut and the upper turn in this region is insured. The wider rim portion also transmits the force to the hole of the wall at a larger angle, so that the radial crushing component against the wall is reduced. Once the fastener is fully locked, the forces are equalized all around.

The fastener here described effectively prevents the nut from pulling through the coil, even under maximum load. The increased locking effect and load distribution allows the length of the fastener to be kept to a minimum, thus effecting a saving in drilling costs. This is an important factor in an application such as mine roof support, where the cost of drilling to accommodate the fasteners is a major consideration. Hole depth is also limited by physical problems such as drift and runout of the drilling bits in material of non-homogeneous composition. This fastener takes full advantage of the hole depth available, and distributes the load over a significantly larger area than previous fasteners.

Although the fastener is illustrated as asing a nut into which a bolt is threaded from the entry end of the hole, it is understood that a bolt head integral with the bolt may be used in place of the nut shown, with a nut threaded onto the lower end of the bolt to apply the axial loading.

What is claimed is:

1. An expansion fastener comprising: a bolt; a spring coil surrounding said bolt, said coil being a flat helically wound strip having generally cylindrical inner and outer surfaces, and said coil having axially spaced turns all of substantial width in the axial direction and being adapted to expand radially under axial load; a bearing element connected to said bolt and having a generally annular portion, said coil having a turn nearest said bearing element free to expand radially; and connecting means surrounding said annular portion and fixedly connected to said bearing element and said nearest turn, said connecting means being adapted to flatten under axial load and having an outer portion adapted to expand and maintain bearing engagement with said nearest turn and an inner portion adapted to contract and grip said annular portion.

2. An expansion fastener as described in claim 1, said nearest turn having a generally circumferential groove on its interior surface defining an upper rim portion constituting said connecting means.

3. An expansion fastener as described in claim 1, said connecting means comprising a washer of dished cross-section disposed between and connected to said nearest turn and said bearing element.

4. An expansion fastener as described in claim 1, said nearest turn having an inwardly bent rim portion connected to said bearing element and constituting said connecting means.

5. An expansion fastener as described in claim 1, said nearest turn having a generally circumferential groove on its interior surface defining an upper rim portion constituting said connecting means, and said groove being disposed obliquely with respect to the inner edge portion of said connecting means so that the rim portion increases in axial width in the direction toward the turn adjacent said nearest turn.

6. An expansion fastener as described in claim 1, said bearing member having welding studs welded to said connecting means.

* * * * *